(12) United States Patent
Lin et al.

(10) Patent No.: US 11,892,409 B1
(45) Date of Patent: Feb. 6, 2024

(54) DISCRETE LIGHT DETECTION DEVICE

(71) Applicant: Taiwan RedEye Biomedical Inc., Hsinchu (TW)

(72) Inventors: Tsung-Jui Lin, Hsinchu (TW); Shuo-Ting Yan, Hsinchu (TW); Kuan-Wei Su, Hsinchu (TW)

(73) Assignee: Taiwan RedEye Biomedical Inc., Hsinchu (TW)

( * ) Notice: Subject to any disclaimer, the term of this patent is extended or adjusted under 35 U.S.C. 154(b) by 0 days.

(21) Appl. No.: 17/973,285

(22) Filed: Oct. 25, 2022

(51) Int. Cl.
  *G01J 3/44* (2006.01)
  *G01N 21/65* (2006.01)
  *G01J 1/42* (2006.01)

(52) U.S. Cl.
  CPC ............... *G01N 21/65* (2013.01); *G01J 1/42* (2013.01); *G01N 2201/0633* (2013.01)

(58) Field of Classification Search
  CPC .... G01N 21/65; G01J 3/44; G01J 3/28; G01J 3/02; A61B 5/0075
  See application file for complete search history.

(56) References Cited

U.S. PATENT DOCUMENTS

| | | | |
|---|---|---|---|
| 6,174,677 B1 * | 1/2001 | Vo-Dinh | C12Q 1/6825 435/287.9 |
| 6,376,843 B1 * | 4/2002 | Palo | G01J 3/457 250/459.1 |
| 8,699,020 B1 | 4/2014 | Zhou et al. | |
| 10,416,567 B2 * | 9/2019 | De Wit | G03F 7/70616 |
| 2003/0022762 A1 | 1/2003 | Jacobs et al. | |
| 2003/0136921 A1 * | 7/2003 | Reel | G01N 21/645 250/458.1 |
| 2003/0227628 A1 | 12/2003 | Kreimer et al. | |
| 2005/0084980 A1 * | 4/2005 | Koo | G01J 3/44 436/171 |
| 2007/0019532 A1 | 1/2007 | Maruyama et al. | |
| 2007/0195320 A1 | 8/2007 | Sriram et al. | |
| 2014/0312212 A1 * | 10/2014 | Schappacher | G01J 3/0224 250/225 |
| 2015/0011896 A1 * | 1/2015 | Yelin | A61B 5/0075 600/476 |
| 2017/0273564 A1 * | 9/2017 | Banke | A61B 5/1455 |

* cited by examiner

*Primary Examiner* — Abdullahi Nur
(74) *Attorney, Agent, or Firm* — RABIN & BERDO, P.C.

(57) ABSTRACT

The present invention includes a shell, a light emitter, a beam splitter, a convergent lens, an optical filter, a collimation unit, a discrete light detection unit, and a processing unit. The shell includes a sample well to contain a sample. The light emitter generates a detection beam towards the beam splitter, the detection beam is reflected by the beam splitter before being converged by the convergent lens onto the sample, and a Raman scattered beam is scattered from the sample. The Raman scattered beam respectively passes through the convergent lens, the beam splitter, the optical filter, and the collimation unit, allowing the collimation unit to collimate the Raman scattered beam into a collimated beam. The discrete light detection unit generates multiple light intensity signals according to the collimated beam received, and the processing unit generates a detection result according to the light intensity signals to help detect toxins.

9 Claims, 7 Drawing Sheets

DISCRETE LIGHT DETECTION DEVICE

BACKGROUND OF THE INVENTION

1. Field of the Invention

The present invention relates to a detection device, and more particularly a discrete light detection device.

2. Description of the Related Art

Malachite green is an organic compound historically used for dying clothes, wool, and paper. After the discovery that malachite green is capable of lowering fungal infection rates and eliminating parasites, and as well as preventing wound infections of fish, malachite green is then widely used for fisheries, such as for transport sanitization purposes or for farming purposes.

Although malachite green is capable of sanitization against aquatic germs, prolonged use of malachite green is discovered to be toxic. While malachite green does not affect the health of aquatic creatures, excessive consumption of malachite green poses serious health consequences to human bodies. For instance, toxins of malachite green is found to increase risks of health hazards such as cancer or genetic damages.

Current methods for detecting toxins such as malachite green rely on the use of a liquid chromatograph/a mass spectrometer. To use the liquid chromatograph/the mass spectrometer, a specimen is purified by a separation process conducted by the liquid chromatograph, wherein complex compositions within the specimen are respectively purified and chronologically analyzed by the mass spectrometer. However, the liquid chromatograph/the mass spectrometer is fairly expensive laboratory equipment, and is often only owned by professional laboratories. Without working in a professional laboratory, and without special trainings for operating the liquid chromatograph/the mass spectrometer, a person would be unable to operate the liquid chromatograph/the mass spectrometer to detect toxins. Furthermore, the liquid chromatograph/the mass spectrometer takes a long time to detect toxins, and therefore a person would be unable to know a detection result of toxins immediately.

Another method to detect toxins involves using rapid testers. However, before testing with the rapid tester, the specimen needs first to be extracted with an extract for approximately 40 minutes, and then to be further tested for an additional 15 minutes by dripping the extract with specimen on the rapid tester. Evidently, this process is very time consuming Since the extract and the rapid tester are consumable, the extract and the rapid tester are eco-unfriendly, and since this method of detecting toxins involves bio-chemistry, consumers are less inclined to use this toxin detection method.

As such, further advancements are needed for detecting toxins more efficiently.

SUMMARY OF THE INVENTION

To overcome the aforementioned problems, the present invention provides a discrete light detection device for conducting Raman spectroscopy. The present invention is able to time-efficiently detect whether a toxin is present according to spectrum signals, all without needing to analyze a specimen within a laboratory. With time-efficient detection of the toxin, the present invention is able to prevent the toxin from being consumed, and therefore decreases risks of the toxin accumulated within a human body.

The discrete light detection device of the present invention includes a shell, a light emitter, a beam splitter, a convergent lens, an optical filter, a collimation unit, a discrete light detection unit, and a processing unit.

The shell includes a sample well, wherein the sample well is configured to contain a sample. The light emitter and the beam splitter are mounted within the shell. The light emitter generates a detection beam towards the beam splitter. A frequency of the detection beam is a first frequency. The convergent lens is mounted on a side wall of the sample well within the shell. The detection beam is reflected by the beam splitter before shooting into the convergent lens. The detection beam is converged onto the sample contained within the sample well by the convergent lens, and as such, a Raman scattered beam is scattered from the sample. The Raman scattered beam has multiple frequencies, and all of the frequencies of the Raman scattered beam are different from the first frequency.

The optical filter, the collimation unit, and the discrete light detection unit are also mounted within the shell. The Raman scattered beam shoots into the beam splitter through the convergent lens, and after being refracted by the beam splitter, the Raman scattered beam shoots into the optical filter. The optical filter filters out light with the first frequency. After the Raman scattered beam passes through the optical filter, the Raman scattered beam shoots into the collimation unit, and the Raman scattered beam is then collimated by the collimation unit into a collimated beam. The collimated beam shoots from the collimation unit into the discrete light detection unit, and the discrete light detection unit generates multiple light intensity signals according to the collimated beam. The processing unit is electrically connected to the discrete light detection unit, and the processing unit receives the light intensity signals and generates a detection result according to the light intensity signals.

In general, when an incident light contacts a sample, photons of the incident light would be scattered by specimen within the sample. If the scattered photons change in energy, in other words, when the incident light changes in frequency after a scattering event, then the scattering event is considered inelastic, and such inelastic scattering event without phonon involvement is also called Raman scattering.

More particularly, Raman scattering can be used for detecting lattice structures, and molecular vibration modes and spin modes. When the incident light contacts molecules of the sample, the incident light and molecular bonds between molecules would interact, and as each of the molecular bonds vibrates with unique frequencies, Raman scattering is used to measure energy differences or shifts between vibrating molecules, so as to identify contents of the sample.

The present invention only requires the sample to be placed within the sample well. Once the sample is placed, the present invention is able to receive the Raman scattered beam from the sample through the discrete light detection unit, generates the light intensity signals according to the Raman scattered beam, and generates the detection result through the processing unit according to the light intensity signals. In other words, a user of the present invention is able to analyze the sample and acquire the detection result of the sample without needing to go to a laboratory. By utilizing an optical detection method, the present invention is also able to time-efficiently analyze the sample for the detection result. As such, the present invention is able to prevent the toxin from being consumed by the user, and therefore decreases risks of the toxin accumulated within the user's body. The present invention is also user friendly, allowing all users without special trainings to use the present invention, and since the present invention does not easily create wastes, users are also more inclined to use the present invention in an eco-friendly manner.

DETAILED DESCRIPTION OF THE INVENTION

Figure 1:
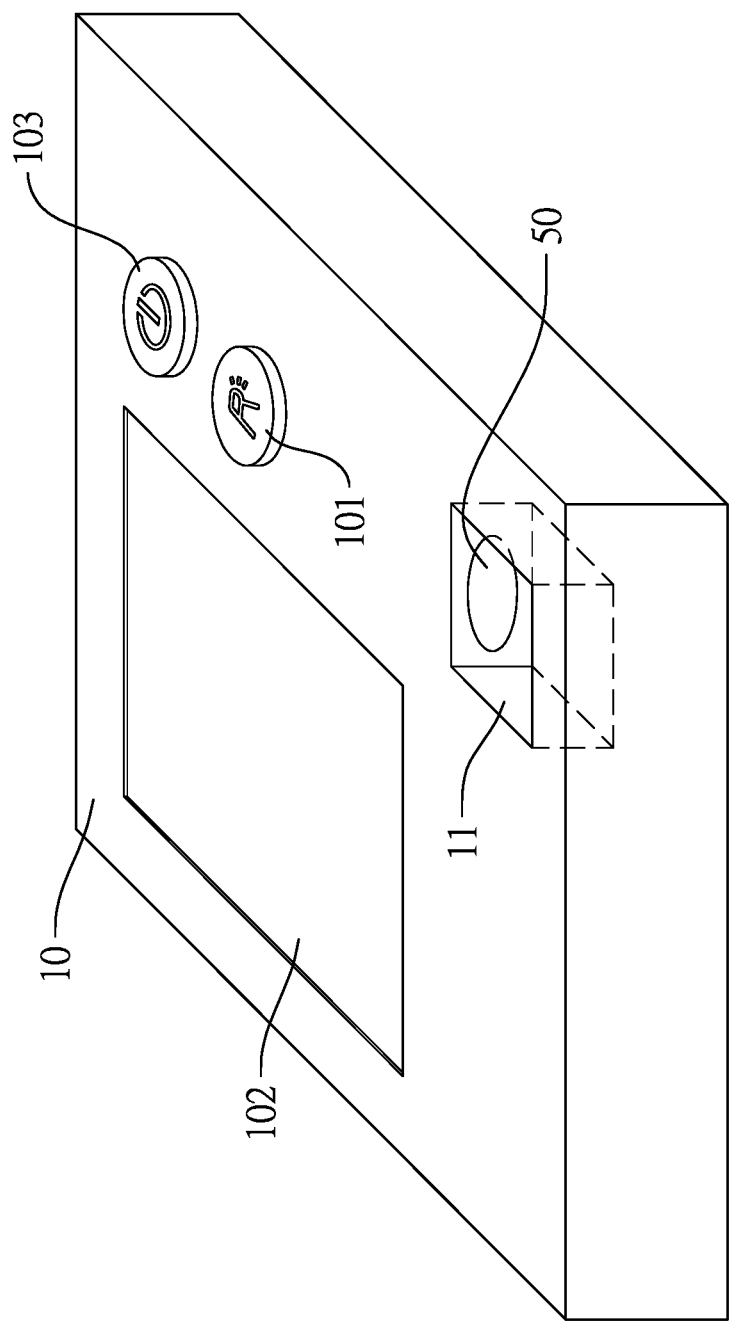
FIG. 1 is a perspective view of a discrete light detection device of the present invention.
Figure 2:
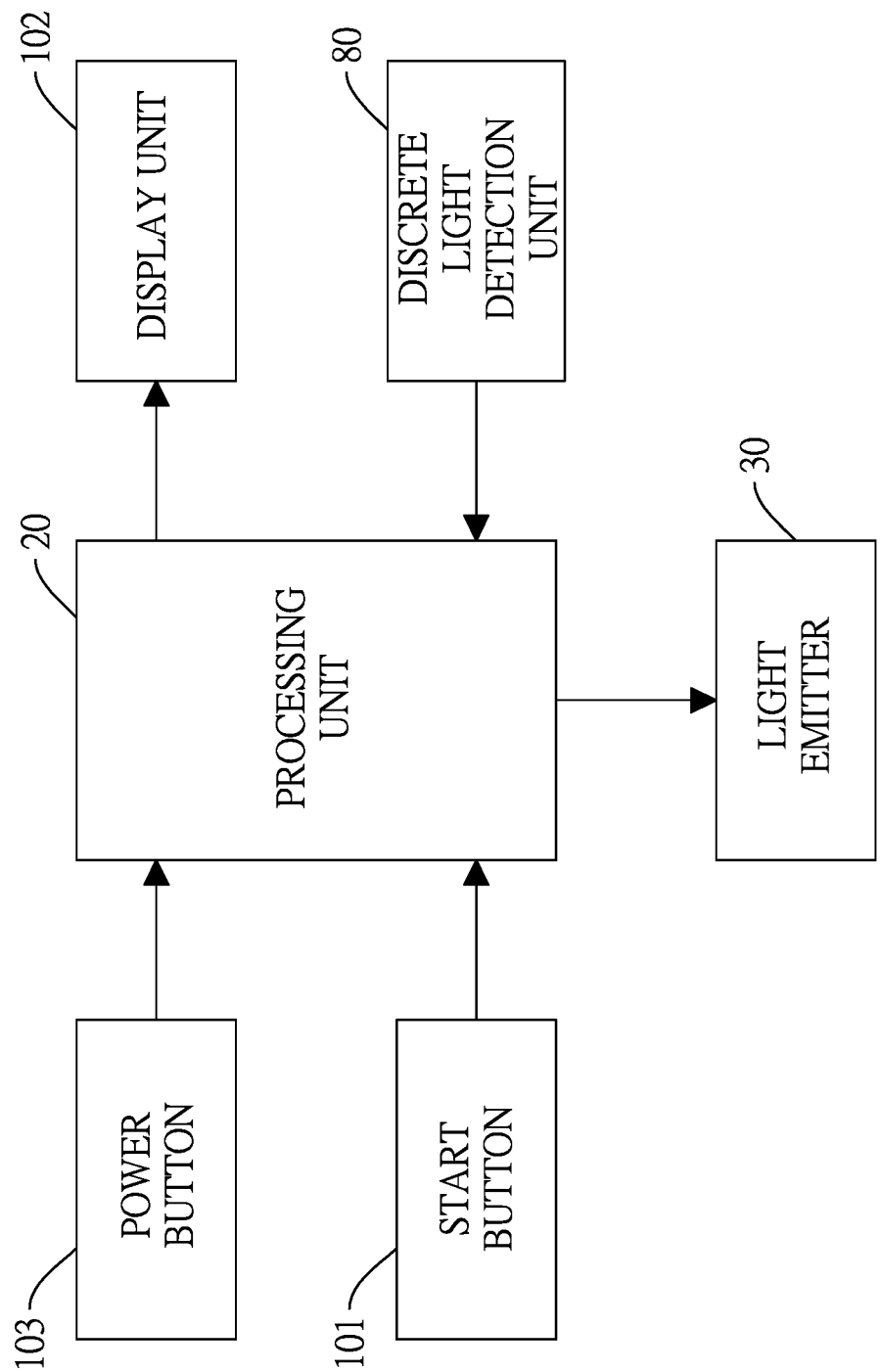
FIG. 2 is a block diagram of the discrete light detection device of the present invention.
Figure 3:
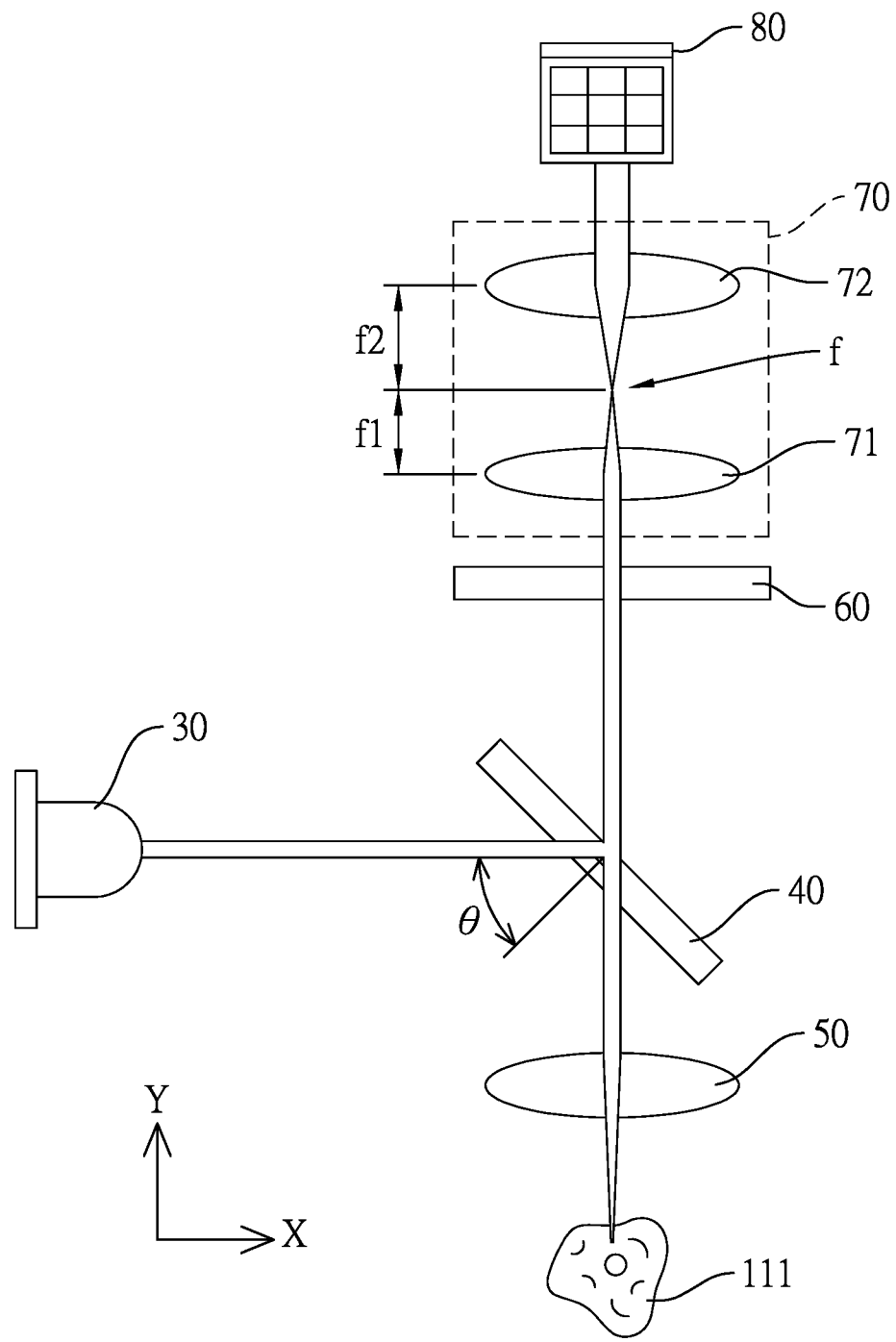
FIG. 3 is a perspective view of a discrete light detection method of the present invention.

With reference to FIGS. 1, 2, and 3, a discrete light detection device of the present invention includes a shell 10, a processing unit 20, a light emitter 30, a beam splitter 40, a convergent lens 50, an optical filter 60, a collimation unit 70, and a discrete light detection unit 80.

The shell 10 includes a sample well 11, wherein the sample well 11 is configured to contain a sample 111. The light emitter 30 and the beam splitter 40 are mounted within the shell 10. The light emitter 30 generates a detection beam towards the beam splitter 40. A frequency of the detection beam is a first frequency.

The convergent lens 50 is mounted on a side wall of the sample well 11 within the shell 10. The detection beam is reflected by the beam splitter 40 before shooting into the convergent lens 50. The detection beam is converged onto the sample 111 contained within the sample well 11 by the convergent lens 50, and as such, a Raman scattered beam is scattered from the sample 111. The Raman scattered beam has multiple frequencies, and all of the frequencies of the Raman scattered beam are different from the first frequency.

The optical filter 60, the collimation unit 70, and the discrete light detection unit 80 are also mounted within the shell. The Raman scattered beam shoots into the beam splitter 40 through the convergent lens 50, and after being refracted by the beam splitter 40, the Raman scattered beam shoots into the optical filter 60. The optical filter 60 filters out light with the first frequency. After the Raman scattered beam passes through the optical filter 60, the Raman scattered beam shoots into the collimation unit 70, and the Raman scattered beam is then collimated by the collimation unit 70 into a collimated beam. The collimated beam shoots from the collimation unit 70 into the discrete light detection unit 80, and the discrete light detection unit 80 generates multiple light intensity signals according to the collimated beam. The processing unit 20 is electrically connected to the discrete light detection unit 80, and the processing unit 20 receives the light intensity signals and generates a detection result according to the light intensity signals.

With reference to FIGS. 1 and 2, the discrete light detection device of the present invention further includes a start button 101, a display unit 102, and a power button 103.

The start button 101, the display unit 102, and the power button 103 respectively electrically connect the processing unit 20. The power button 103 is used to turn on or off power for the discrete light detection device. The display unit 102 is used to receive and display the detection result. The start button 101 is mounted on the shell 10 for a user to operate, allowing an initiation of a detection process of the discrete light detection device. For example, when the start button 101 is triggered, the start button 101 generates and sends a start detection signal to the processing unit 20. When the processing unit 20 receives the start detection signal, the processing unit 20 starts the light emitter 30, and receives the light intensity signals generated by the discrete light detection unit 80. The processing unit 20 further generates the detection result according to the light intensity signals, and displays the detection result through the display unit 102.

When using the discrete light detection device, the present invention requires the user to put the sample 111 within the sample well 11. The user can then press the start button 103 to initiate a trigger, allowing the start button 103 to generate the start detection signal. When the processing unit 20 receives the start detection signal, the processing unit 20 then initiates the light emitter 30 for emitting the detection beam. The processing unit 20 further receives the Raman scattered beam emitted from the sample 111 through the discrete light detection unit 80, generates the light intensity signals according to the Raman scattered bream, and lastly, generates the detection result according to the light intensity signals.

As such, the user is able to analyze the sample 111 and acquire the detection result of the sample 111 without needing to go to a laboratory. By utilizing an optical detection method, the present invention is also able to time-efficiently analyze the sample 111 for the detection result. As such, the present invention is able to prevent the toxin from being consumed by the user, and therefore decreases risks of the toxin accumulated within the user's body. The present invention is also user friendly, allowing all users without special trainings to use the present invention, and since the present invention does not easily create wastes, users are also more inclined to use the present invention in an eco-friendly manner.

With reference to FIG. 3, in an embodiment of the present invention, the light emitter 30 is a laser emitter, and the laser emitter emits the detection beam with wavelengths from 532 nanometers (nm) to 1064 nm. The optical filter 60 is an optical band-stop filter or an optical low-pass filter. An angle of incidence θ is 45 degrees for the detection beam incident on the beam splitter 40.

The light emitter 30 emits the detection beam along a first direction X towards the beam splitter 40. When the detection beam is partially reflected by the beam splitter 40, the detection beam travels along a second direction Y towards the convergent lens 50. The Raman scattered beam emitted by the sample 111 travels along the second direction Y and respectively passes the convergent lens 50, the beam splitter 40, the optical filter 60, and the collimation unit 70 before entering the discrete light detection unit 80. The discrete light detection unit 80 receives the Raman scattered beam that has been collimated by the collimation unit 70. In the present embodiment, the first direction X and the second direction Y are perpendicular.

Furthermore, the collimation unit 70 includes a first convex lens 71 and a second convex lens 72. The first convex lens 71 has a first focal length f1, the second convex lens 72 has a second focal length f2, and the second focal length f2 is longer than the first focal length f1. A position of a first focal point of the first convex lens 71 overlaps with a position of a second focal point of the second convex lens 72. In other words, a focal point f is shared between the first convex lens 71 and the second convex lens 72. After the Raman scattered beam passes through the optical filter 60, the Raman scattered beam shoots through the first convex lens 71 of the collimation unit 70. As such, the Raman scattered beam is focused by the first convex lens 71 before passing through the second convex lens 72 of the collimation unit 70. As the Raman scattered beam passes through the second convex lens 72, the Raman scattered beam is collimated into the collimated beam by the second convex lens 72.

In other words, when the Raman scattered beam enters the collimation unit 70, the Raman scattered beam is focused at the focal point f by the first convex lens 71, before further traveling to the second convex lens 72. Since the first convex lens 71 and the second convex lens 72 share the same focal point f, the Raman scattered beam focused at the focal point f would propagate to the second convex lens 72 from the focal point f, allowing the Raman scattered beam to be properly collimated by the second convex lens 72 into the collimated beam. Furthermore, since the second focal length f2 of the second convex lens 72 is longer than the first focal length f1 of the first convex lens 71, a cross-section of the collimated beam would be greater than a cross-section of the Raman scattered beam entering the collimation unit 70. As a result, the discrete light detection unit 80 is able to receive the collimated beam with a greater cross-section, allowing the discrete light detection unit 80 to detect with better accuracy.

Figure 4:
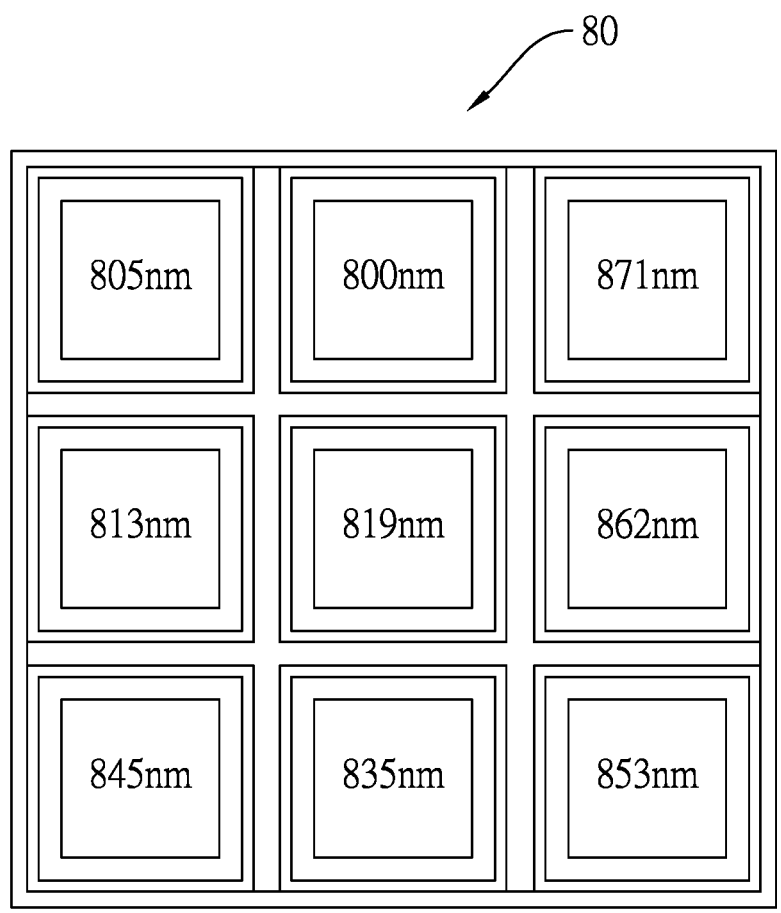
FIG. 4 is a perspective view of a discrete light detection unit of the discrete light detection device of the present invention.
Figure 5:
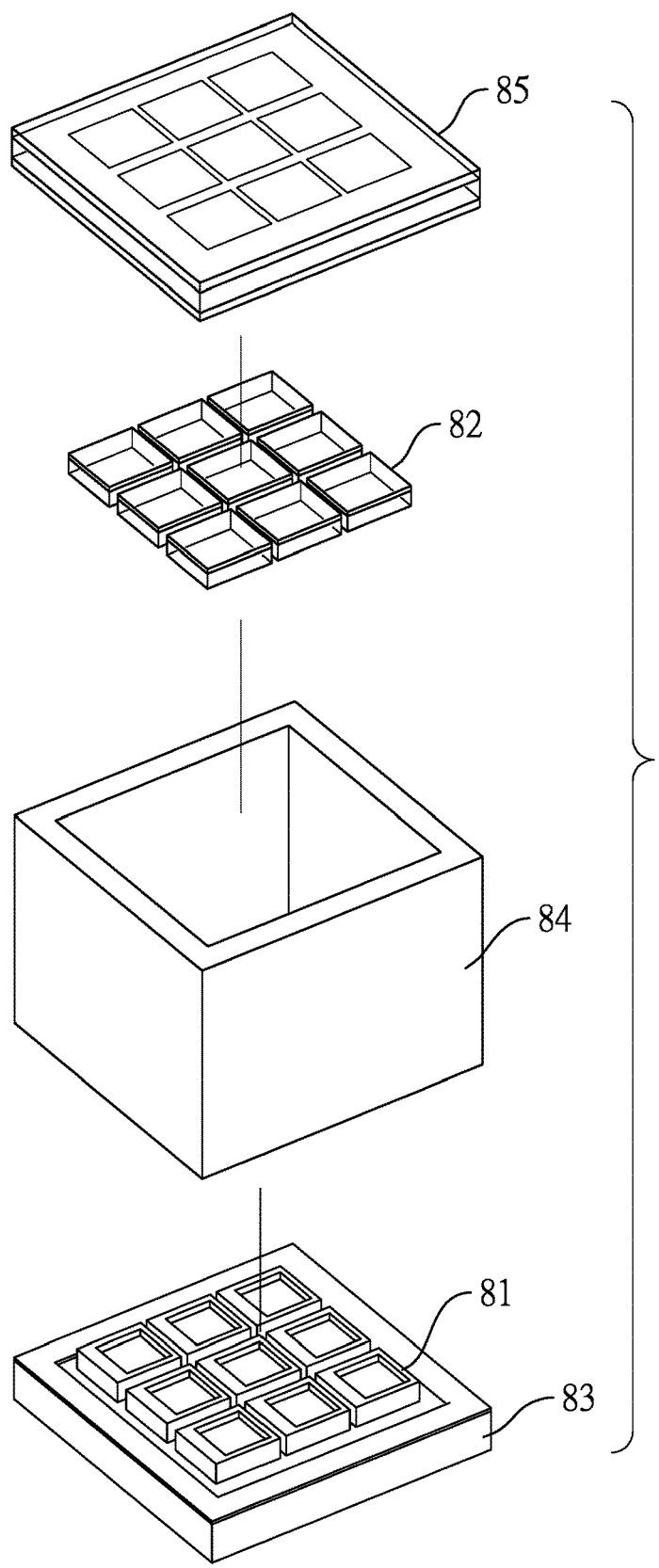
FIG. 5 is an exploded-perspective view of the discrete light detection unit of the discrete light detection device of the present invention.

With reference to FIGS. 4 and 5, the discrete light detection unit 80 includes multiple light intensity sensors 81 and multiple discrete optical filters 82. The light intensity sensors 81 are mounted on a circuit board 83, and the light intensity sensors 81 are electrically connected to the processing unit 20 through wires mounted on the circuit board 83. In the present embodiment, the light intensity sensors 81 are mounted on the circuit board 83 in a matrix. A number of the light intensity sensors 81 ranges from two to twenty five.

The discrete optical filters 82 are mounted at locations corresponding to where the light intensity sensors 81 are mounted. In other words, a mounting location of one of the discrete optical filters 82 and a mounting location of one of the light intensity sensors 81 are corresponding in a one-to-one manner. For example, the discrete light detection unit 80 further includes a detector shell 84 and a lid 85. The light intensity sensors 81 are mounted on the circuit board 83, and the discrete optical filters 82 are respectively placed on the light intensity sensors 81. The circuit board 83, the light intensity sensors 81, and the discrete optical filters 82 are all mounted within the detector shell 84 and under the lid 85. The collimated beam shoots into the detector shell 84 through the lid 85 and shoots towards the discrete optical filters 82. After the collimated beam is discretely filtered by one of the discrete optical filters 82, each of the filtered collimated beams having different filtered light frequencies would shoot towards one of the light intensity sensors 81 and be received by one of the light intensity sensors 81 respectively.

The discrete optical filters 82 each have a respective filtering bandwidth, and each of the filtering bandwidths is unique. The collimated beam shoots towards the discrete optical filters 82, discretely passes through the discrete optical filters 82, and then respectively enters the light intensity sensors 81. In other words, each of the light intensity sensors 81 respectively receives a part of the collimated beam filtered by one of the discrete optical filters 82. More particularly, the filtered collimated beam received by each of the light intensity sensors 81 would have different frequencies in different frequency bands.

In the present embodiment, the discrete optical filters 82 of the discrete light detection unit 80 are respectively an optical band-pass filter, wherein only light within a specified bandwidth or a specific wavelength is allowed to pass through.

Furthermore, the light intensity sensors 81 of the discrete light detection unit 80 respectively include at least one peak light intensity sensor and at least one trough light intensity sensor. The at least one peak light intensity sensor is used to determine whether a light of the specified bandwidth or the specific wavelength has a peak intensity value, and the at least one trough light intensity sensor is used to determine whether the light has a trough intensity value. The discrete optical filters 82 of the discrete light detection unit 80 include at least one peak intensity optical filter and at least one trough intensity optical filter. The at least one peak intensity optical filter is mounted at a location corresponding to a location of the at least one peak light intensity sensor, and the at least one trough intensity optical filter is mounted at a location corresponding to a location of the at least one trough light intensity sensor.

In other words, the at least one peak light intensity sensor receives a part of the collimated beam filtered by the at least one peak intensity optical filter, and the at least one trough light intensity sensor receives a part of the collimated beam filtered by the at least one trough intensity optical filter.

Furthermore, the light intensity signals generated by the discrete light detection unit 80 include at least one peak light intensity signal or at least one trough light intensity signal. The at least one peak light intensity sensor generates the at least one peak light intensity signal according to the collimated beam filtered by the at least one peak intensity optical filter. The at least one trough light intensity sensor generates the at least one trough light intensity signal according to the collimated beam filtered by the at least one trough intensity optical filter.

When the processing unit 20 receives the at least one peak light intensity signal and the at least one trough light intensity signal, the processing unit 20 accordingly determines whether the at least one peak light intensity signal is greater than or equal to a peak intensity threshold, and whether the at least one trough light intensity signal is less than or equal to a trough intensity threshold.

When the at least one peak light intensity signal is greater than or equal to the peak intensity threshold, and when the at least one trough light intensity signal is less than or equal to the trough intensity threshold, the processing unit generates the detection result as an alert signal. Vice versa, the processing unit generates the detection result as a safe signal.

In another embodiment, when the processing unit 20 receives the at least one peak light intensity signal and the at least one trough light intensity signal, the processing unit 20 determines whether a difference of the at least one peak light intensity signal minus the at least one trough light intensity signal is greater than or equal to a configured intensity threshold. When the difference is greater than or equal to the configured intensity threshold, the processing unit 20 generates the detection result as the alert signal. Vice versa, the processing unit 20 generates the detection result as the safe signal.

In other embodiments, the discrete light detection unit 80 may only include the at least one peak light intensity sensor or the at least one trough light intensity sensor. The discrete optical filters 82 of the discrete light detection unit 80 may only include the at least one peak intensity optical filter or the at least one trough intensity optical filter. The processing unit 20 only needs to determine whether the at least one peak light intensity signal is greater than or equal to the peak intensity threshold, or whether the at least one trough light intensity signal is less than or equal to the trough intensity threshold. When either determination is true, the processing unit 20 generates the detection result as the alert signal. When either determination is false, the processing unit 20 generates the detection result as the safe signal.

Since the lights received by the light intensity sensors 81 are all lights filtered by the discrete optical filters 82, the light intensity signals received by the light intensity sensors 81 respectively correspond to light intensities across different spectrums. By determining light intensities across different spectrums, the present invention is able to determine whether the Raman scattered beam emitted from the sample 111 matches a Raman spectrum known for a specific specimen, and as such, the present invention is able to further determine whether the sample 111 contains the specific specimen.

For example, when the discrete light detection device is used for detecting malachite green, the detection beam emitted by the laser emitter is a laser beam of 785 nm wavelength. The optical band-stop filter or the optical low-pass filter are all optical filters designated for 785 nm wavelength. A number of the light intensity sensors 81 is nine, and the nine light intensity sensors 81 are used to sense light intensity signals across nine different spectral frequencies.

In other words, the optical band-stop filter is a filter that passes most frequencies unaltered, but attenuates those in a specific range to very low levels. For example, the optical band-stop filter is used to stop lights of 381 THz frequency. Namely, the optical band-stop filter is used to filter out lights of 785 nm wavelength, and thus allowing lights with wavelengths other than 785 nm to pass through.

The optical low-pass filter is a filter that passes signals with a frequency lower than a selected cutoff frequency. For example, the optical low-pass filter is used to pass lights with the frequencies lower than 381 THz. Namely, the optical low-pass filter is used to filter out the lights with wavelengths less than 785 nm, and thus allowing lights with wavelengths greater than 785 nm to pass through.

Figure 6:
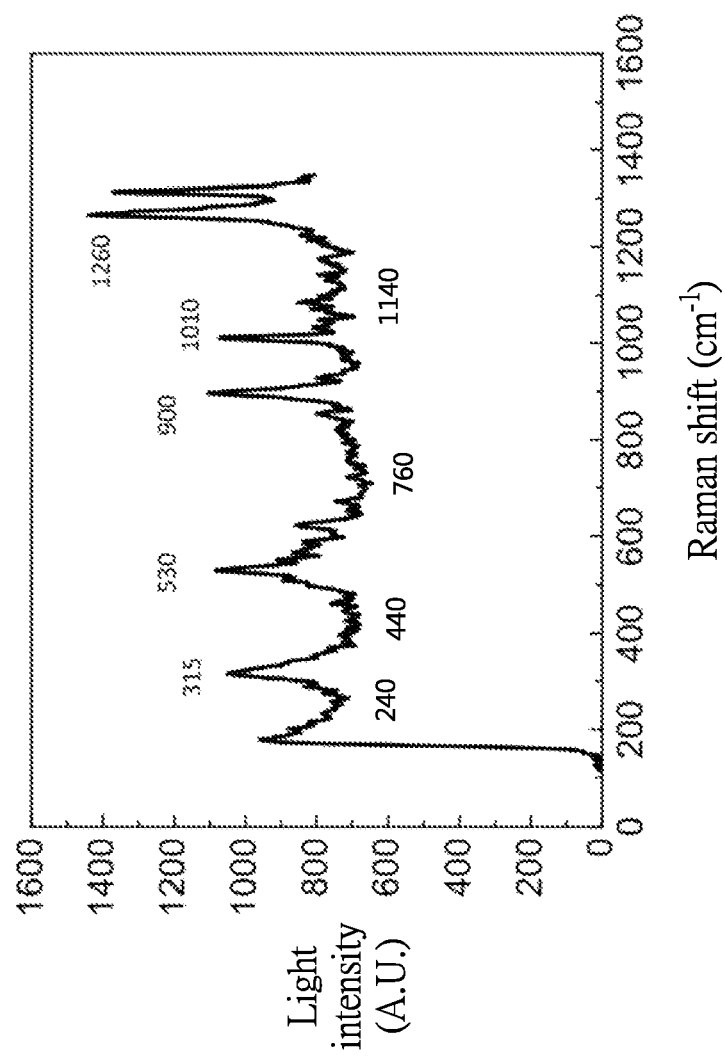
FIG. 6 is a perspective view of Raman shift of malachite green.
Figure 7:
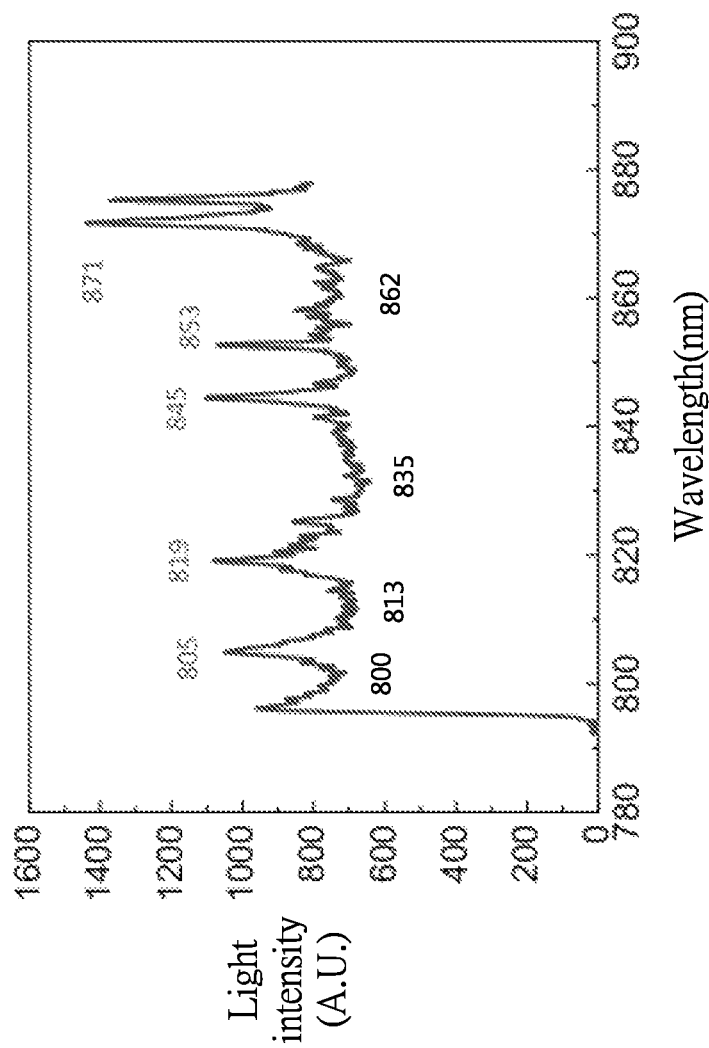
FIG. 7 is a perspective view of the present invention detecting malachite green.

With reference to FIGS. 6 and 7, FIG. 6 is a perspective view of Raman shift of malachite green. Raman shift is a difference in reciprocal of a wavelength of the detection beam entering the sample 111 and a wavelength of the Raman scattered beam emitted from the sample 111.

For instance, if the wavelength of the detection beam is $\lambda_0$, and the wavelength of the Raman scattered beam emitted from the sample 111 is $\lambda$, then the Raman shift may be written as:

$$\text{Raman shift} = \frac{1}{\lambda_0} - \frac{1}{\lambda}.$$

According to FIG. 6, Raman shift of malachite green at 315 inverse centimeters ($cm^{-1}$), 530 $cm^{-1}$, 900 $cm^{-1}$, 1010 $cm^{-1}$, and 1260 $cm^{-1}$ has relatively higher light intensities in arbitrary units (A.U.) such as, for example, lumen (lm) or lumen per square meter (lux, or lx). These particular wavelengths with higher light intensities are also peaks of Raman shift of malachite green. The present invention therefore uses these peaks as characteristic points to identify malachite green.

According to FIG. 7, since the wavelength of the detection beam is set and known to be 785 nm, the present invention is able to substitute $\lambda_0$ as 785 nm in the aforementioned equation, and thus calculates wavelengths of the Raman scattered beam at 805 nm, 819 nm, 845 nm, 853 nm, and 871 nm would respectively correspond to Raman shifts at 315 $cm^{-1}$, 530 $cm^{-1}$, 900 $cm^{-1}$, 1010 $cm^{-1}$, and 1260 $cm^{-1}$.

Therefore as depicted in FIG. 4, the peak intensity optical filters of the discrete optical filters 82 filter lights at the previously calculated wavelengths of 805 nm, 819 nm, 845 nm, 853 nm, and 871 nm.

Furthermore, according to FIG. 6, Raman shift of malachite green at 240 $cm^{-1}$, 440 $cm^{-1}$, 760 $cm^{-1}$, and 1140 $cm^{-1}$ has relatively lower light intensities. These particular wavelengths with lower light intensities are also troughs of Raman shift of malachite green. The present invention therefore also uses these troughs as characteristic points to identify malachite green.

According to FIG. 7, since the wavelength of the detection beam is 785 nm, the present invention is able to substitute $\lambda_0$ as 785 nm in the aforementioned equation, and thus calculates wavelengths of the Raman scattered beam at 800 nm, 813 nm, 835 nm, and 862 nm would respectively correspond to Raman shifts at 240 $cm^{-1}$, 440 $cm^{-1}$, 760 $cm^{-1}$, and 1140 $cm^{-1}$.

Therefore as depicted in FIG. 4, the trough intensity optical filters of the discrete optical filters 82 filter lights at the previously calculated wavelengths of 800 nm, 813 nm, 835 nm, and 862 nm.

The discrete optical filters 82 are positioned according to the wavelengths each of the discrete optical filters 82 intends to filter. The peak intensity optical filters and the trough intensity optical filters are mixed mounted, in other words, any one of the peak intensity optical filters is adjacent to the trough intensity optical filters. For example, from left to right of a first row (top row) in FIG. 4, the wavelengths that the discrete optical filters 82 intend to filter are respectively 805 nm, 800 nm, and 871 nm. From left to right of a second row (middle row) in FIG. 4, the wavelengths that the discrete optical filters 82 intend to filter are respectively 813 nm, 819 nm, and 862 nm. From left to right of a third row (bottom row) in FIG. 4, the wavelengths that the discrete optical filters 82 intend to filter are respectively 845 nm, 835 nm, and 853 nm.

In conclusion, since all types of samples each correspond to a unique Raman spectrum, and since Raman shifts can be calculated from characteristic points within the unique Raman spectrum, a combination of the discrete optical filters 82 used and placed within the discrete light detection unit 80 can be configured in the present invention to determine whether the Raman scattered beam emitted from the sample 111 matches a particular Raman spectrum, and thus determine whether a particular content or specimen is present within the sample 111.

In other words, although the present invention is used to determine whether malachite green is present in the sample 111 in the present embodiment, the present invention is also able to determine whether other chemical compounds are present in the sample 111 by modifying the discrete light detection unit 80.

The discrete light detection unit 80 may be modified to have a different combination of the discrete optical filters 82 for filtering out a different set of wavelengths corresponding to the characteristic wavelengths of another chemical compound.

The present invention is advanced for being cost-effective, having small size, and being modular. The present invention is modular for ease of modifying the combination of the discrete optical filters 82 used in the discrete light detection unit 80. This modular ability allows the present invention to detect different chemical compounds within the sample 111. As such, the present invention provides the discrete light detection device that utilizes Raman spectrum for analyzing the sample 111. The present invention is structurally simple and is able to be miniaturized.

The above only details a few possible embodiments of the present invention, rather than imposing limits to the present invention. Any technical personnel within similar fields to the present invention is free to make modifications or equivalent changes to what is disclosed by the present invention. However, what is disclosed by the present invention would also be encompassed and protected by what is claimed for the present invention.

What is claimed is:

1. A discrete light detection device, comprising:
   a shell, comprising a sample well, wherein the sample well is configured to contain a sample;
   a light emitter, mounted within the shell, and generating a detection beam; wherein a frequency of the detection beam is a first frequency;
   a beam splitter, mounted within the shell; wherein the light emitter shoots the detection beam towards the beam splitter;
   a convergent lens, mounted on a side wall of the sample well within the shell; wherein the detection beam is reflected by the beam splitter before shooting into the convergent lens, the detection beam is converged onto the sample contained within the sample well by the convergent lens, and a Raman scattered beam is scattered from the sample; wherein the Raman scattered beam has multiple frequencies, and all of the frequencies of the Raman scattered beam are different from the first frequency;
   an optical filter, mounted within the shell; wherein the Raman scattered beam shoots into the beam splitter through the convergent lens, and after being refracted by the beam splitter, the Raman scattered beam shoots into the optical filter; wherein the optical filter filters out light with the first frequency;
   a collimation unit, mounted within the shell; wherein after the Raman scattered beam passes through the optical filter, the Raman scattered beam shoots into the collimation unit, and the Raman scattered beam is then collimated by the collimation unit into a collimated beam;
   a discrete light detection unit, mounted within the shell; wherein the collimated beam shoots from the collimation unit into the discrete light detection unit, and the discrete light detection unit generates multiple light intensity signals according to the collimated beam; and
   a processing unit, electrically connecting the discrete light detection unit, receiving the light intensity signals, and generating a detection result according to the light intensity signals,
   wherein the discrete light detection unit further comprises:
      multiple light intensity sensors, electrically connecting the processing unit; wherein the light intensity sensors are mounted in a matrix, and
      multiple discrete optical filters, mounted at locations corresponding to the light intensity sensors; wherein the discrete optical filters each have a respective filtering bandwidth, and each of the filtering bandwidths is unique; and
   wherein the collimated beam shoots towards the discrete optical filters, and after the collimated beam is filtered by the discrete optical filters, the filtered collimated beam shoots towards the light intensity sensors.

2. The discrete light detection device as claimed in claim 1, wherein the discrete optical filters of the discrete light detection unit are respectively an optical band-pass filter.

3. The discrete light detection device as claimed in claim 1, wherein the light intensity sensors of the discrete light detection unit comprise at least one peak light intensity sensor;
   wherein the discrete optical filters of the discrete light detection unit comprise at least one peak intensity optical filter;
   wherein the at least one peak intensity optical filter is mounted corresponding to the at least one peak light intensity sensor;
   wherein the light intensity signals generated by the discrete light detection unit comprise at least one peak light intensity signal;
   wherein the at least one peak light intensity sensor generates the at least one peak light intensity signal according to the collimated beam filtered by the at least one peak intensity optical filter;
   wherein when the processing unit receives the at least one peak light intensity signal, the processing unit determines whether the at least one peak light intensity signal is greater than or equal to a peak intensity threshold; and
   wherein when the at least one peak light intensity signal is greater than or equal to the peak intensity threshold, the processing unit generates the detection result as an alert signal; and vice versa, the processing unit generates the detection result as a safe signal.

4. The discrete light detection device as claimed in claim 1, wherein the light intensity sensors of the discrete light detection unit comprise at least one trough light intensity sensor;
   wherein the discrete optical filters of the discrete light detection unit comprise at least one trough intensity optical filter;
   wherein the at least one trough intensity optical filter is mounted corresponding to the at least one trough light intensity sensor;
   wherein the light intensity signals generated by the discrete light detection unit comprise at least one trough light intensity signal;
   wherein the at least one trough light intensity sensor generates the at least one trough light intensity signal according to the collimated beam filtered by the at least one trough intensity optical filter;

wherein when the processing unit receives the at least one trough light intensity signal, the processing unit determines whether the at least one trough light intensity signal is less than or equal to a trough intensity threshold; and wherein when the at least one trough light intensity signal is less than or equal to the trough intensity threshold, the processing unit generates the detection result as an alert signal; and vice versa, the processing unit generates the detection result as a safe signal.

5. The discrete light detection device as claimed in claim 1, wherein the light intensity sensors of the discrete light detection unit comprise at least one peak light intensity sensor and at least one trough light intensity sensor;

wherein the discrete optical filters of the discrete light detection unit comprise at least one peak intensity optical filter and at least one trough intensity optical filter;

wherein the at least one peak intensity optical filter is mounted corresponding to the at least one peak light intensity sensor, and the at least one trough intensity optical filter is mounted corresponding to the at least one trough light intensity sensor;

wherein the light intensity signals generated by the discrete light detection unit comprise at least one peak light intensity signal and at least one trough light intensity signal;

wherein the at least one peak light intensity sensor generates the at least one peak light intensity signal according to the collimated beam filtered by the at least one peak intensity optical filter;

wherein the at least one trough light intensity sensor generates the at least one trough light intensity signal according to the collimated beam filtered by the at least one trough intensity optical filter;

wherein when the processing unit receives the at least one peak light intensity signal and the at least one trough light intensity signal, the processing unit accordingly determines whether the at least one peak light intensity signal is greater than or equal to a peak intensity threshold, and whether the at least one trough light intensity signal is less than or equal to a trough intensity threshold; and wherein when the at least one peak light intensity signal is greater than or equal to the peak intensity threshold, and when the at least one trough light intensity signal is less than or equal to the trough intensity threshold, the processing unit generates the detection result as an alert signal; and vice versa, the processing unit generates the detection result as a safe signal.

6. The discrete light detection device as claimed in claim 1, wherein the light intensity sensors of the discrete light detection unit comprise at least one peak light intensity sensor and at least one trough light intensity sensor;

wherein the discrete optical filters of the discrete light detection unit comprise at least one peak intensity optical filter and at least one trough intensity optical filter;

wherein the at least one peak intensity optical filter is mounted corresponding to the at least one peak light intensity sensor, and the at least one trough intensity optical filter is mounted corresponding to the at least one trough light intensity sensor;

wherein the light intensity signals generated by the discrete light detection unit comprise at least one peak light intensity signal and at least one trough light intensity signal;

wherein the at least one peak light intensity sensor generates the at least one peak light intensity signal according to the collimated beam filtered by the at least one peak intensity optical filter;

wherein the at least one trough light intensity sensor generates the at least one trough light intensity signal according to the collimated beam filtered by the at least one trough intensity optical filter;

wherein when the processing unit receives the at least one peak light intensity signal and the at least one trough light intensity signal, the processing unit determines whether a difference of the at least one peak light intensity signal minus the at least one trough light intensity signal is greater than or equal to a configured intensity threshold; and wherein when the difference is greater than or equal to the configured intensity threshold, the processing unit generates the detection result as an alert signal; and vice versa, the processing unit generates the detection result as a safe signal.

7. The discrete light detection device as claimed in claim 1, wherein the collimation unit further comprises:
a first convex lens, having a first focal length; and
a second convex lens, having a second focal length; wherein the second focal length is longer than the first focal length;
wherein a position of a first focal point of the first convex lens overlaps with a position of a second focal point of the second convex lens;
wherein after the Raman scattered beam passes through the optical filter, the Raman scattered beam shoots through the first convex lens of the collimation unit and shoots through the second convex lens of the collimation unit;
wherein the Raman scattered beam is collimated into the collimated beam by the second convex lens.

8. The discrete light detection device as claimed in claim 1, wherein:
the optical filter is an optical band-stop filter or an optical low-pass filter;
an angle of incidence is 45 degrees for the detection beam incident on the beam splitter;
the light emitter is a laser emitter.

9. The discrete light detection device as claimed in claim 1, further comprising:
a start button, electrically connecting the processing unit;
wherein when the start button is triggered, the start button generates and sends a start detection signal to the processing unit;
wherein when the processing unit receives the start detection signal, the processing unit starts the light emitter, receives the light intensity signals generated by the discrete light detection unit, and generates the detection result according to the light intensity signals.

* * * * *